March 7, 1967  F. A. SHOMAKER  3,307,335
GAS FILTER

Filed March 24, 1965  2 Sheets-Sheet 1

INVENTOR
FRANK A. SHOMAKER
BY Fisher, Christen, Sabol & Caldwell
ATTORNEYS

INVENTOR
FRANK A. SHOMAKER

BY
Fisher, Christen, Sabol & Caldwell
ATTORNEYS

United States Patent Office 3,307,335
Patented Mar. 7, 1967

3,307,335
GAS FILTER
Frank A. Shomaker, 308 Green Gorge Road,
Signal Mountain, Tenn. 37377
Filed Mar. 24, 1965, Ser. No. 442,288
9 Claims. (Cl. 55—267)

This invention relates to filtering apparatus, and more particularly to a device for removing moisture, oil, oil vapor, dirt and other foreign contaminants from gases.

One of the features of this invention is the provision of a compact apparatus for subjecting gas under pressure to two stages of filtering action. In a preferred embodiment of the invention the entering gases are first subjected to circumferential motion and subsequent axial change of direction to cause the heavier contaminants to be thrown out of the gas stream by inertial force.

The gas is then forced through a porous filtering medium which effectively removes contaminants of microscopic size and is again subjected to a reversal of direction. The gases become expanded, with a resulting decrease in temperature after leaving the porous material which results in condensation of vapor, the gas is finally passed through a conduit which is in heat exchanging relationship with the incoming gas to thoroughly dehydrate the gas before it is discharged from the filter apparatus.

Other objects and advantages will be apparent to those skilled in the art after reading the following specification in connection with the accompanying drawings, in which.

Figure 1:
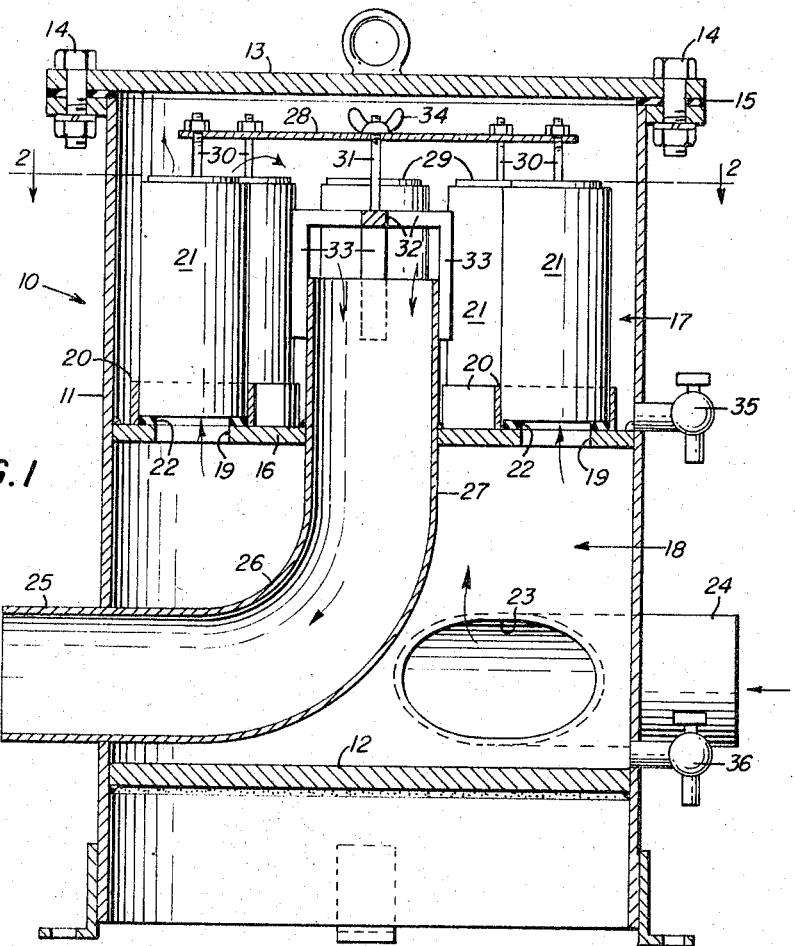
FIGURE 1 is a cross-sectional elevation of a preferred form of gas filter constructed in accordance with the teachings of this invention.

In the drawings, the numeral 10 indicates generally a vessel having a cylindrical side wall 11, a bottom wall 12 and a removable cover plate 13 secured to the open top of the vessel by means of bolt 14 and having an annular gasket 15 to prevent leakage. The interior of the vessel is sub-divided by a horizontal baffle plate 16 into an upper compartment 17 and a lower compartment 18.

The baffle 16 is provided with a series of circumferentially spaced openings 19 and surrounding each of these openings, spaced slightly outwardly from the edge of the opening, are a series of upstanding retainer rings 20. Each of these retainer rings provides a mounting for a rigid cylindrically shaped filter element 21. In order to insure that the gas to be filtered does not leak pass the filter element, it is desirable to place an annular gasket 22 between the bottom of each of the filter elements and the baffle plate 16.

Gas to be filtered is introduced to the lower chamber 18 through an opening 23 in communication with a tangentially arranged inlet conduit 24. The filtered gas leaves the vessel through a central outlet conduit 27 which passes downwardly through the interior of the lower chamber and out through a suitable opening provided in the wall thereof. The outlet conduit includes a curved section 26 completely surrounded by, and in heat exchanging relationship with, the air in the lower chamber, and leading to a radially extending portion 25.

The porous filter elements 21 are removably secured in their respective locations by a clamping means which includes a circular plate 28 which supports a series of downwardly extending bolts 30 which bear against one end of each of the filter elements. Each of the filter elements comprises a cylindrical shell 21, of metal, or other rigid material such as plastic, having perforated end caps 29 to contain a loose granular filtering material, such as activated charcoal within.

The plate, in turn, is removably held in place by a threaded bolt 31 which extends through a suitable opening provided in the center of the plate and is supported at its lower end by a cross member 32 having a pair of depending legs 33 welded, or otherwise attached, to the upper end of the vertical portion of the outlet conduit 27. Clamping pressure in a downward direction can be exerted by means of a thumb nut 34 threaded onto the bolt 31 above the plate 28. Drain valves 35 and 36 are provided respectively for the upper compartment 17 and lower compartment 18 to enable collected liquids to be removed from these compartments at periodic intervals.

In operation the unfiltered gas is forced into the lower chamber 18 under pressure through the tangential inlet and revolves about in this chamber causing the heavier particles contained in the gas to be thrown outwardly against the side wall and collect on the bottom of the chamber. Ultimately, the gas is forced axially upwardly through the openings 19 into one end of each of the porous filter elements 21 and exits upwardly from their upper ends into the upper chamber 17, the microscopic particles of contaminating solid and liquid being trapped in these elements. The gas leaves the filter elements and combines in an upwardly directed annular stream which is directed downwardly by the plate 28. As the gas is released from the filter elements its pressure is reduced causing a temperature reduction in the upper chamber which cools the walls of the chamber, the plate 28 and especially the walls 21 of the filter elements. The pressure of the plate forces a portion of the air back downwardly around the entire outer surface of each of the elements causing moisture to condense on these walls. Condensation also takes place on the plate and on the inner wall of the upper chamber which will collect on the baffle 16.

The gases, upon leaving the filter elements, must undergo several changes of direction in passing upwardly towards the cover 13, converging inwardly towards the center, thence downwardly through the outlet and in doing so will lose further particles which may have passed through the filter elements. Since the lower portion of the outlet conduit passes downwardly through the lower chamber 18 before leaving the filter apparatus, a considerable portion of the outlet is completely surrounded by, and is in heat exchanging relationship with, the incoming air. The incoming air in the lower chamber being under a greater pressure than the air escaping into the upper chamber the temperature of the air in the lower chamber will be higher than that of the air passing through the outlet and therefore this outgoing air will be warmed in passing through the outlet; consequently, when the air leaves the apparatus it will be completely dehydrated and free of contaminants.

Figure 2:
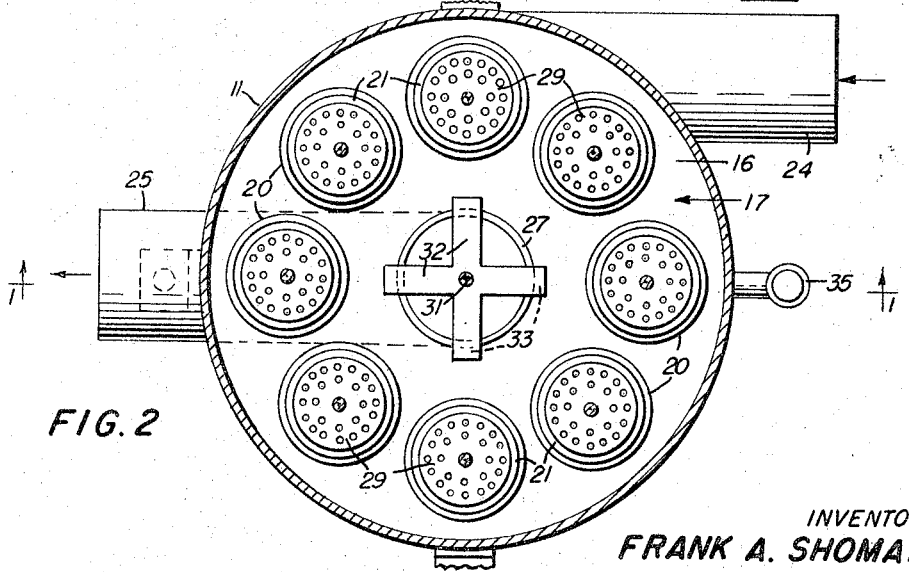
FIGURE 2 is a cross-section taken on the line 2—2 of FIGURE 1.
Figure 3:
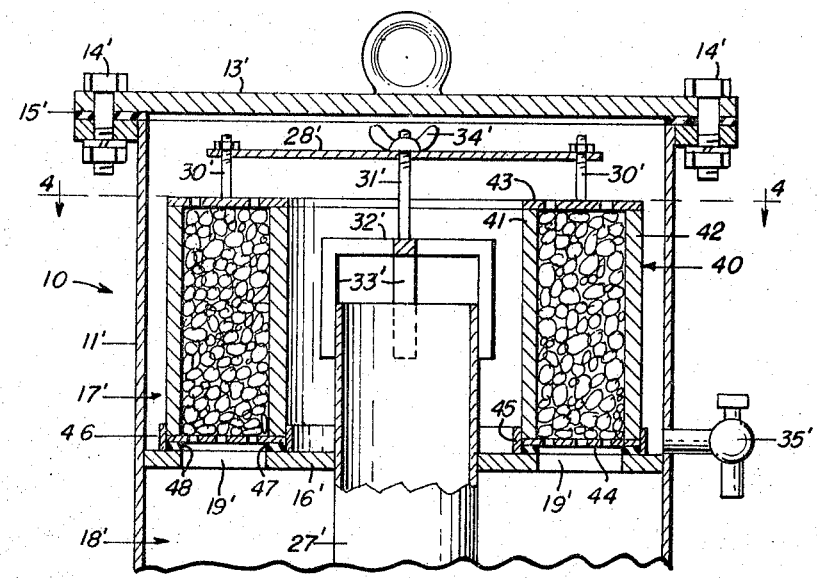
FIGURE 3 is a fragmentary cross-section like that of FIGURE 1 but showing a modified form of the invention.
Figure 4:
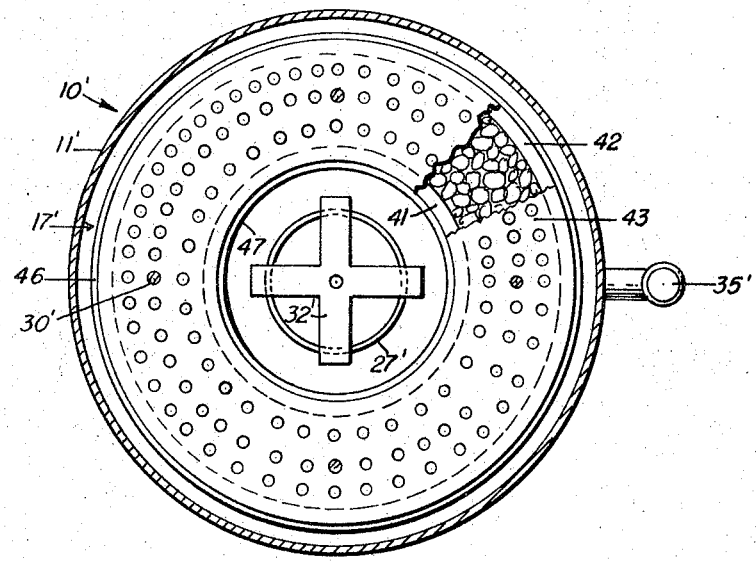
FIGURE 4 is a cross-section taken on the line 4—4 of FIGURE 3.

A modified form of the invention indicated generally by numeral 10' is shown in FIGURES 3 and 4 which differs only in that a single annular filter element replaces the several cylindrical filter elements 21 used in the previously described form. As in the invention shown in FIGURES 1 and 2 the modified form of invention comprises a container having a vertical cylindrical side wall 11' provided with a removable cover 13' attached to the container by means of bolts 14 and having a sealing gasket 15'. As in the previous form the container is subdivided by means of a horizontal baffle plate 16' into upper and lower compartments 17' and 18' respectively.

The lower compartment 18' of the modified form is similar in every respect with that of the previously described form having tangential inlet and an outlet conduit in heat exchanging relationship with the air in that compartment. Baffle plate 16' is provided with a series of annularly arranged openings 19' but, instead of providing a series of cylindrical filter elements, a single annular filter element, indicated generally by numeral 40, is positioned over the openings 19'.

The annular filter element may comprise inner and outer cylindrical shells 41 and 42 respectively, formed of some rigid material such as metal or plastic and provided with upper and lower ring-shaped perforated end walls 43 and 44 respectively, the interior of the element being filled with a granular filtering material, such as activated charcoal, or other suitable material.

A pair of upstanding concentrically arranged annular flanges 45 and 46 may be provided on the upper surface of the baffle 16' to position the filter element with its lower end wall over the openings 19' and annular gaskets 47 and 48 may be provided to seal the lower end of the filter element 40.

As in the previously described modification the filter element is removably secured in place by means of a circular plate 28' provided at its periphery with several downwardly projecting pins or bolts 30' which engage the upper wall 43 of the filter element. A vertical threaded element 31' is supported on a horizontal element 32' having downwardly extending legs 33' secured to the upper end of conduit 27'. A thumb nut 34' is received at the upper end of the element 31' to apply clamping pressure on the filter element. Drain valve 35' is provided for periodic removal of liquid.

Operation of the modified form of the invention is generally similar to that of the invention shown in FIGURES 1 and 2. The gas undergoes a preliminary separation of heavy particles as a result of horizontal circular motion in the lower chamber 18' and passes upwardly through the openings 19' into the annular filter element 40. While it is true that the gas enters the filter at annularly spaced locations, during its upward travels it becomes dispersed throughout the entire bed of granular material within the filter and thus combines into an annular stream before it is discharged from the upper end walls 43.

From this point the path of travel follows that of the previously described form of the filter in that the plate 28' directs portions of the gas downwardly around both the inner and outer shells 41 and 42 where a certain proportion of condensation occurs. The gas is also diverted downwardly through the central outlet conduit 27 and is dehydrated in the lower chamber before passing out of the filter.

It will thus be seen that this invention provides an extremely effective filter having granular filtering elements which can be easily renewed by removing the cover and substituting new elements. The lower chamber can easily be cleaned by introducing a solvent liquid through the inlet conduit or, with the cover and filtering element, or elements, removed, through the openings in the horizontal baffle, any residue of solvent being removed through the drain valve in the lower chamber.

Having described several forms in which the invention can be practiced, it will be understood that various changes and modifications can be made which will come within the scope of the annexed claims.

I claim:
1. A gas filter comprising a cylindrical container having a removable cover, said container being subdivided into upper and lower chambers by a horizontal wall having a plurality of circumferentially spaced openings therein, each of said openings being surrounded by an upstanding annular retaining ring, a plurality of cylindrical porous filter blocks each being seated within a respective retainer ring to place only the lower surface of each block in communication with the interior of the lower chamber, a tangential inlet for said lower chamber, an outlet conduit having a vertical inlet portion extending upwardly in communication with the interior of the upper chamber through the center of said horizontal wall, and passing downwardly through the lower chamber in heat-exchanging relationship with entering gas, a clamping plate, means for supporting the plate in downwardly clamping engagement with the upper ends of the filter blocks.

2. The invention as defined in claim 1, wherein said filter elements comprise cylindrical metal containers having perforated end walls containing granular filtering material.

3. The invention as defined in claim 1, wherein said filter elements comprise cylindrical plastic containers having perforated end walls containing granular filtering material.

4. In a gas filter the combination including a vessel having a first chamber and a cylindrical second chamber, tangential inlet conduit means for introducing unfiltered air to the interior of the second chamber and to induce rotary motion thereto about the axis thereof, outlet conduit means for filtered gas having one end in communication with a central area of the interior of the first chamber, annularly arranged granular filter means, said filter means including a series of annularly arranged inlet openings at one end and an annular series of outlet openings at the other end, means for mounting the filter means in said first chamber with the openings in one end in communication with the interior of the second chamber and the opening at the other end of the filter means in communication with the interior of the first chamber to provide an annular discharge stream from said filter means concentric with respect to the axis of said one end of the outlet conduit means, radial baffle means axially spaced from said openings at the other end of the filter means for diverting gas toward the outer portions of the filter means and toward the outlet conduit means.

5. The invention as defined in claim 4, wherein said filter means comprises a plurality of annularly disposed individual filter elements, each of said elements having an inlet disposed in communication with one of said annularly arranged inlet openings.

6. The invention as defined in claim 4, wherein said filter means includes an annular element having an inlet disposed in communication with all of said annularly arranged inlet openings.

7. Gas filtering apparatus including a first closed container and a second closed cylindrical chamber, said second chamber having tangential inlet means for unfiltered gas and axially directed outlet means, porous filter means annularly arranged within said first chamber, said filter means comprising a plurality of hollow cylindrical structures containing a filtering medium, said structures having perforate end walls and an imperforate side wall, one of the end walls of each structure being in communication with said axially directed outlet means, the other of the end walls of each structure being in communication with the interior of the first chamber, outlet conduit means for filtered gas having an inlet portion concentrically disposed with respect to the outlet means of the filtering means, and radially disposed baffle means axially spaced from said outlet means for directing gas toward the filter means.

8. The invention as defined in claim 7, wherein said filter means comprises a hollow structure containing a filtering medium, said structure having perforate end walls and an imperforate side wall.

9. The invention as defined in claim 7, wherein said filter means includes a hollow structure having a pair of concentrically disposed radially spaced cylindrical imperforate side walls and a pair of axially spaced perforate end walls containing a filtering medium.

References Cited by the Examiner

UNITED STATES PATENTS

| | | | |
|---|---|---|---|
| 2,056,755 | 10/1936 | Welch. | |
| 2,096,484 | 10/1937 | Farmer | 55—518 X |
| 2,919,030 | 12/1959 | Grant et al. | 210—323 X |
| 2,984,361 | 5/1961 | Marvel | 210—307 |
| 3,093,469 | 6/1963 | Woolston et al. | 55—517 X |
| 3,124,443 | 3/1964 | Hellingman et al. | 55—482 X |

FOREIGN PATENTS

| | | |
|---|---|---|
| 412,850 | 5/1910 | France. |
| 778,179 | 12/1934 | France. |
| 978,018 | 11/1950 | France. |
| 1,040,686 | 5/1953 | France. |
| 1,121,854 | 5/1956 | France. |
| 860,698 | 2/1961 | Great Britain. |

FRANK W. LUTTER, *Primary Examiner.*

HARRY B. THORNTON, *Examiner.*

D. TALBERT, *Assistant Examiner.*